US011128159B2

(12) United States Patent
Kemmerer

(10) Patent No.: US 11,128,159 B2
(45) Date of Patent: Sep. 21, 2021

(54) IGNITION-REMOTE OUTPUT GENERATOR WITH ADJUSTABLE DELAYS AND BATTERY ISOLATION CONTROL

(71) Applicant: Wavtech, LLC, Mesa, AZ (US)

(72) Inventor: Jason Kemmerer, Thousand Oaks, CA (US)

(73) Assignee: Wavtech, LLC, Mesa, AZ (US)

( * ) Notice: Subject to any disclaimer, the term of this patent is extended or adjusted under 35 U.S.C. 154(b) by 91 days.

(21) Appl. No.: 16/734,353

(22) Filed: Jan. 5, 2020

(65) Prior Publication Data

US 2020/0220369 A1 Jul. 9, 2020

Related U.S. Application Data

(60) Provisional application No. 62/788,815, filed on Jan. 5, 2019.

(51) Int. Cl.
| | |
|---|---|
| *H02J 7/00* | (2006.01) |
| *F02N 11/08* | (2006.01) |
| *H02J 9/06* | (2006.01) |
| *H04R 3/00* | (2006.01) |

(52) U.S. Cl.
CPC .......... *H02J 7/0063* (2013.01); *F02N 11/087* (2013.01); *F02N 11/0814* (2013.01); *F02N 11/0848* (2013.01); *F02N 11/0862* (2013.01); *H02J 7/0047* (2013.01); *H02J 9/06* (2013.01); *F02N 2011/0874* (2013.01); *H04R 3/00* (2013.01)

(58) Field of Classification Search
CPC .......... H02J 7/0063; H02J 9/06; H02J 7/0047; H02J 2310/46; F02N 11/0862; F02N 11/087; F02N 11/0814; F02N 11/0848; F02N 2011/0874; F02N 2200/063; F02N 2250/02; F02N 11/0866; H04R 3/00
See application file for complete search history.

(56) References Cited

U.S. PATENT DOCUMENTS

| | | | | |
|---|---|---|---|---|
| 2006/0212212 | A1* | 9/2006 | Akasaka | F02D 41/047 701/112 |
| 2016/0082946 | A1* | 3/2016 | Kodawara | B60L 50/16 701/22 |
| 2017/0294801 | A1* | 10/2017 | Kim | B60L 53/00 |

* cited by examiner

*Primary Examiner* — Hal Kaplan
*Assistant Examiner* — Thai H Tran
(74) *Attorney, Agent, or Firm* — Stetina Brunda Garred & Brucker

(57) ABSTRACT

A multiple wired input/output device provides generated battery or regulated voltage outputs with adjustable turn-on and turn-off timing with sequence priority to engine running status. Separate aftermarket audio components, or a combination of aftermarket audio and non-audio related components are activated and deactivated in appropriate order for a variety of installation applications. One or more switched battery voltage inputs override the sequence priority of generated battery or regulated voltage output(s) in relation to engine running status, order or duration.

21 Claims, 9 Drawing Sheets

IGNITION-REMOTE OUTPUT GENERATOR WITH ADJUSTABLE DELAYS AND BATTERY ISOLATION CONTROL

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present disclosure relates to automotive electrical and audio systems, and more particularly, to multiple switched battery or regulated voltage outputs with settable turn-on and turn-off timing in relation to alternator charging status for purposes of activating/deactivating or isolating aftermarket audio equipment and accessories for optimum integration with or replacement of original factory vehicle electrical and audio systems or components.

2. Related Art

All modern internal combustion automobiles are equipped with an alternator that generates a voltage while the engine is running to recharge a connected 12-volt or higher voltage negative ground battery system and supplies additional power for connected electrical systems and devices. When the vehicle engine is off and the alternator is not generating power, the vehicle battery system provides the reserve power for the starter motor to start the engine as well as for powering certain connected electrical systems and devices when parked. Most modern automobiles are also equipped with audio entertainment systems and other electronic devices that are pre-installed by the vehicle manufacturer, and may be referred to as original, factory, stock or OEM (original equipment manufacturer) components. Some OEM components such as the audio system are automatically activated when the vehicle engine is started and automatically deactivated when the engine is stopped but may also be contingent upon other vehicle status data such as unlocking/locking or opening/closing a door or setting the ignition key to the accessory position. The means by which these OEM systems and devices are activated/deactivated in relation to engine running and other contingent status data varies between models and manufacturers. While older automobiles often provided a switched voltage directly from the vehicle starting key position (commonly referred to as a switched-ignition wire), modern vehicles more commonly generate control signals to indirectly activate/deactivate specific electronic systems in a predetermined timing sequence to avoid component start-up timing conflicts by computer-controlled triggers and system status data via a digital vehicle communication bus system. Further, modern internal combustion automobiles may also incorporate a function commonly referred to as stop-start, whereby the engine will automatically shut off temporarily when the vehicle is stationary in order to conserve fuel and reduce emissions by minimizing idle time and then automatically start again with driver input to accelerate. Stop-start systems may continue to provide an activation trigger to certain OEM electronics such as the audio system that would otherwise shut down when the engine is turned off manually by the driver since such factory electronics have been specifically designed to function without interruption during significant battery voltage drops when the engine starter is frequently cranking to restart the vehicle during stop-start events.

Typically, an OEM audio system is comprised of a head unit which is the interface for sources such as AM/FM radio, satellite radio, compact disc (CD) player, digital audio player and navigation. These modules may be integrated into the head unit or configured as separate modules that communicate or pass signal between each other by analog or digital means. Additionally, the head unit may include the amplification stage to drive connected loudspeakers mounted in various locations throughout the vehicle. If the power output capacity or number of channels of head unit amplification is limited with respect to driving each of the connected loudspeakers, a typical factory system may also include one or more external audio power amplifiers.

While most vehicles may include a factory audio system, many owners may desire to personalize, augment or improve upon the OEM sound system performance or function by replacing factory components with or adding aftermarket equipment. A given factory loudspeaker system may have limited frequency response that does not span the entirety of the audible frequency range or have limited output capability, so various configurations of loudspeakers, from tweeters, mid-range speakers, and subwoofers may be replaced or added. Additionally, the power output capacity of the factory head unit or factory amplifiers may be limited with respect to driving each aftermarket loudspeaker, so a typical installation may also include replacing and/or adding one or more aftermarket audio power amplifiers. The original vehicle battery and charging system may lack sufficient peak output power to properly supply the amplifiers, so a high value capacitor, additional battery or increased capacity alternator may also be incorporated into the aftermarket installation. Given the complexities of modern vehicle factory electronic systems, however, an installer may face several installation challenges in adapting aftermarket equipment to function properly or as desired by the end user.

If a factory switched-ignition wire is available in a particular vehicle to be used for turning on and off an aftermarket amplifier via its remote turn-on input terminal, in most cases the battery voltage on the switched-ignition wire will become active as soon as the key is turned and will then suddenly drop significantly during starter cranking. This initial switched-ignition wire battery voltage can start the aftermarket amplifier turning on immediately but then starter cranking induced voltage drop may interrupt the aftermarket amplifier from fully powering on or cause it to shut off and restart since almost no aftermarket amplifier is designed to function under such low voltage conditions. During frequent stop-start events the starter cranking voltage drop may also cause aftermarket amplifiers to shut down and restart, which is particularly exacerbated while drawing significant current when the audio system is already playing loudly. This partial or complete shutdown of aftermarket amplifiers can cause large audible system pop noises to pass through to the connected loudspeakers, or simply stop the music from playing during frequent stop-start events. Additionally, if the factory head unit has a different turn-on timing than the battery voltage present on a switched-ignition wire and different turn-on timing than an aftermarket amplifier utilizing the switched-ignition wire for its remote turn-on trigger, these boot-up timing differences between components may cause loud system pops as the aftermarket amplifier can pass DC-offset and other anomalous signals generated by the factory head unit as it is being powered.

Since a factory switched-ignition wire is not often available in modern vehicles, another means to activate/deactivate aftermarket audio equipment and accessories may need to be employed, but in the present state of the art, all available solutions are undesirable due to inconvenience, complexity or start-up sequence compatibility issues with aftermarket amplifiers.

A physical switch may be installed to provide a switched battery voltage to turn on and turn off an aftermarket amplifier via its remote trigger input terminal, but such a switch has no relation to engine running status and must be manually activated by the user and remembered to be deactivated after stopping the engine to avoid prolonged drain on the battery. Although the user can wait until all other factory electronics are booted up and running steadily before turning on aftermarket amplifiers with a manual switch, inconsistent timing may still cause a boot-up sequence conflict that results in loud system pop noises passing through to connected loudspeakers.

A voltage detection circuit could be constructed to detect a specific voltage threshold of when engine is running and the alternator has begun to generate a charging voltage above that of the battery voltage at rest and used to trigger a switched battery or regulated voltage output for purposes of activating an aftermarket amplifier via its remote turn-on input terminal, but such a circuit would inherently have all of the same potential turn-on/turn-off system pop noises due to timing conflict issues with aftermarket amplifiers as a factory switched-ignition wire and equally unable to compensate for starter cranking voltage drop.

While there are some aftermarket digital bus interface modules designed for replicating factory radio bus functions when replacing the factory radio (commonly referred to as radio replacement interfaces), such interfaces only work with specific vehicle bus systems and require complex reverse engineering and programming for each factory bus protocol by vehicle manufacturer and model to interpret original digital bus commands as an ignition on command in order to trigger generation of a switched-ignition wired output. Such interfaces also have all of the same potential timing conflict issues with aftermarket amplifiers as a factory switched-ignition wire or voltage detection circuit and likewise unable to compensate for starter cranking voltage drop.

None of the existing methods utilizing a factory switched-ignition wire, manual switch, voltage detection circuit or digital bus interface are able to trigger aftermarket amplifiers to turn on or off in a particular timing order to prevent undesirable loud system pops from passing through to connected loudspeakers, nor prevent the large battery voltage drop during starter cranking events from causing partial or complete shut down and reboot of aftermarket amplifiers with each engine starting event. Therefore, there is a need in the art for an improved ignition-remote output generator that addresses the aforementioned deficiencies. There is also a need for a device for integrating aftermarket electronics into factory vehicle electronics systems and controlling power delivery based on engine running status.

SUMMARY

The present disclosure describes an improved system and method for detecting engine running status and intent to drive the vehicle by monitoring battery system voltage changes with respect to the order and duration of each event via a wired constant battery voltage input and at least one generated battery or regulated voltage output with adjustable turn-on and turn-off delays to allow proper adaptation of a variety of aftermarket audio or non-audio related components to a variety of factory electrical and audio system configurations.

In certain embodiments of the present disclosure, a multiple wired input/output device is described that provides generated battery or regulated voltage outputs or regulated voltage outputs with adjustable turn-on and turn-off timing with sequence priority to engine running status for activating/deactivating separate aftermarket audio components or a combination of aftermarket audio and non-audio related components in appropriate order for a variety of installation applications.

In another embodiment of the present disclosure, one or more switched battery voltage inputs may override the sequence priority of generated battery or regulated voltage output(s) in relation to engine running status, order or duration.

In another embodiment of the present disclosure, a multiple wired input/output device is described that can connect and disconnect an auxiliary battery system from a main starting battery in relation to engine running status, duration or sequence via at least two generated battery or regulated voltage outputs or at least one generated battery or regulated voltage output and one generated chassis ground output. These outputs can control relays in combination with or directly a battery isolation solenoid in order to separate a main and auxiliary batteries with respect to main battery voltage changes and timing establishing engine running status and intent to drive or park. These controlled outputs can therefore prevent undesirable component shut down during stop-start events and prevent the main starting battery from being drained while at providing least one switched battery or regulated voltage output for continued activation of aftermarket audio components connected to the auxiliary battery for continued operation while the engine is not running for a set period of time, such as during a stop-start event, and after a set period of time (representing that the vehicle is parked) deactivate all generated battery voltage and chassis ground outputs in order to keep the batteries separated until the next engine starting event occurs without continued current drain on either battery.

The present disclosure thus provides apparatus, systems and methods for controlling activation/deactivation of one or more connected aftermarket audio or non-audio related components via multiple generated battery or regulated voltage outputs in relation to vehicle engine running status, duration or sequence with ability to be overridden manually by a switched battery voltage input and with the ability to connect/disconnect two batteries or more for purposes of accommodating aftermarket installation with a variety of factory vehicle electrical or audio systems.

BRIEF DESCRIPTION OF THE DRAWINGS

These and other features and advantages of the various embodiments disclosed herein will be better understood with respect to the following description and drawings, in which.

Common reference numerals are used throughout the drawings and the detailed description to indicate the same elements.

DETAILED DESCRIPTION

The detailed description set forth below in connection with the appended drawings is intended as a description of the presently preferred embodiments of the ignition-remote output generator with adjustable delays and battery isolation control, herein after referred to as an IGN-REM Generator, and is not intended to represent the only form in which the presented embodiments may be developed or utilized. It is further understood that the use of relational terms such as first and second and the like are used solely to distinguish one from another entity without necessarily requiring or implying any actual such relationship or order between such entities.

Figure 1A:
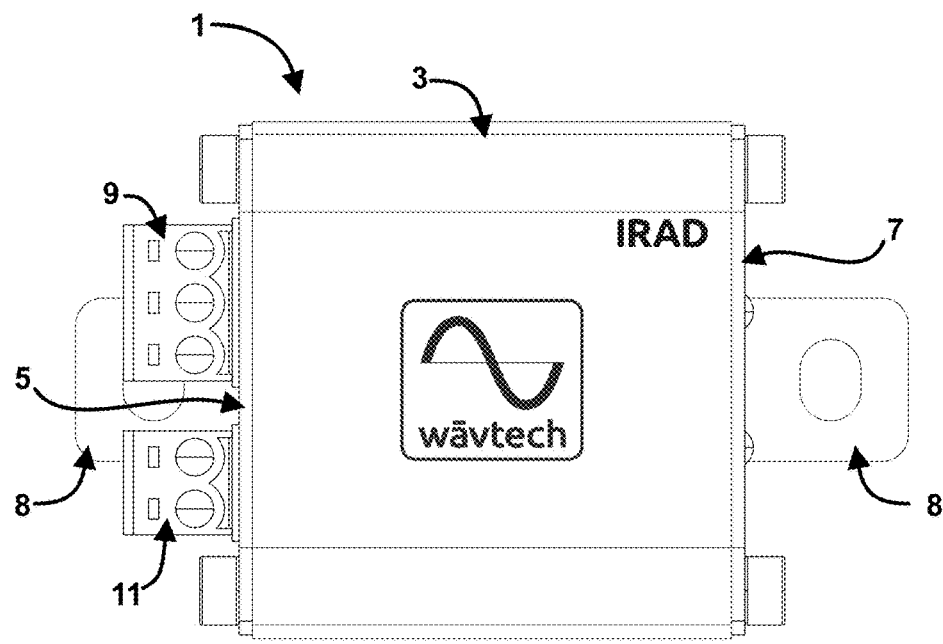
FIGS. 1A-1C depict top, left side, and right side views, respectively, of an ignition-remote output generator with adjustable delays and battery isolation control as an external device in accordance with one embodiment of the present disclosure.

FIG. 1A depicts one embodiment of an IGN-REM Generator 1 in accordance with the present disclosure generally comprised of an enclosure 3 with an input/output connection panel 5 and a programming panel 7. The enclosure 3 may include a pair of tabs 8 via which the IGN-REM Generator 1 is mounted to a structure, e.g., the interior structure of the vehicle in a car audio installation.

Figure 1B:
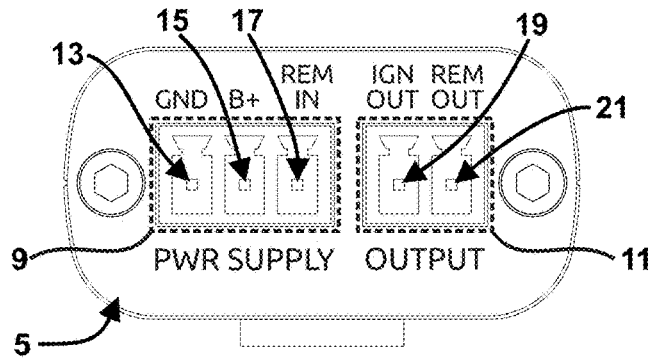

FIG. 1B shows the input/output connection panel 5 according to one embodiment, which includes a power supply connection terminal 9 and an output connection terminal 11. The power supply connection terminal 9 is comprised of a chassis ground connection 13, a constant vehicle battery B+ connection 15 and a switched battery voltage input connection 17. In other embodiments more than one switched battery voltage connection 17, or any other manual trigger method such as a ground trigger or a momentary switch may be present.

In addition to the power supply connection terminal 9, the input/output connection panel 5 also includes an output connection terminal 11, which is comprised of at least one output connection 19 that corresponds to a generated battery voltage output or a regulated voltage output (which are collectively referred to herein as a source voltage output) related to ignition detection status. The output terminal 11 may also include one or more source voltage output connection(s) 21 which corresponds to a direct wired input via a switched battery voltage input connection 17 and may also be contingent upon ignition threshold detection sequence and timing related to the constant vehicle battery B+ connection 15.

Figure 1C:
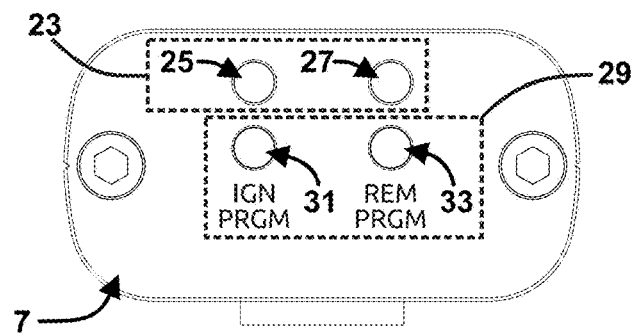

FIG. 1C shows the programming panel 7 according to one embodiment, which includes input devices 29 and display devices 23. In one embodiment the input devices 29 include a momentary switch 31 which enables user input for programming settings primarily related to ignition threshold detection and its associated generated source voltage output turn-on/off delays. In other embodiments the programming panel 7 may also include another momentary switch 33 which enables input for programming settings primarily related to a switched battery voltage input and its corresponding generated source voltage output and associated turn-on and turn-off delays. Although the present disclosure refers the input devices 29 as separate momentary switches 31 and 33, other switch configurations such as more momentary switches for additional corresponding functions or other types of switches such as rotary-types or slide types in which the switch input states can be set, may be utilized without departing from the scope of the present disclosure.

In addition to the input devices 29, the programming panel 7 may also include corresponding display devices 23 for the purpose of providing user feedback during a programming process that utilizes the input devices 29 as well as providing corresponding visual status of the generated source voltage outputs via the output connection terminal 11. In one embodiment these display devices 29 are one or more single color light emitting diodes (LEDs) 25 and 27 that may be flashed or continuously illuminated to provide indication of different operating states of the IGN-REM generator 1. The LED 25 primarily corresponds to input from momentary switch 31 during programming and output status of the output connection 19 during operation of the IGN-REM generator 1. The LED 27 corresponds primarily to input from momentary switch 33 during programming and output status of the output connection 21 during operation of the IGN-REM generator 1. Both LEDs 25 and 27 may be illuminated or flashed simultaneously or alternating to indicate specific programming feedback such as operational mode change or to indicate operational status. Although the present disclosure refers to the display devices 23 as of the LED type, other display types such as a segmented alpha-numeric LED display or an LCD alpha-numeric display, among others, may be utilized. Additionally, although the present disclosure shows display devices 23 for providing user feedback during a programming process and operational status, in other embodiments that use input devices 29 other than momentary switches which may inherently provide some value status based upon position, such an embodiment may not require any display devices 23.

Figure 2:
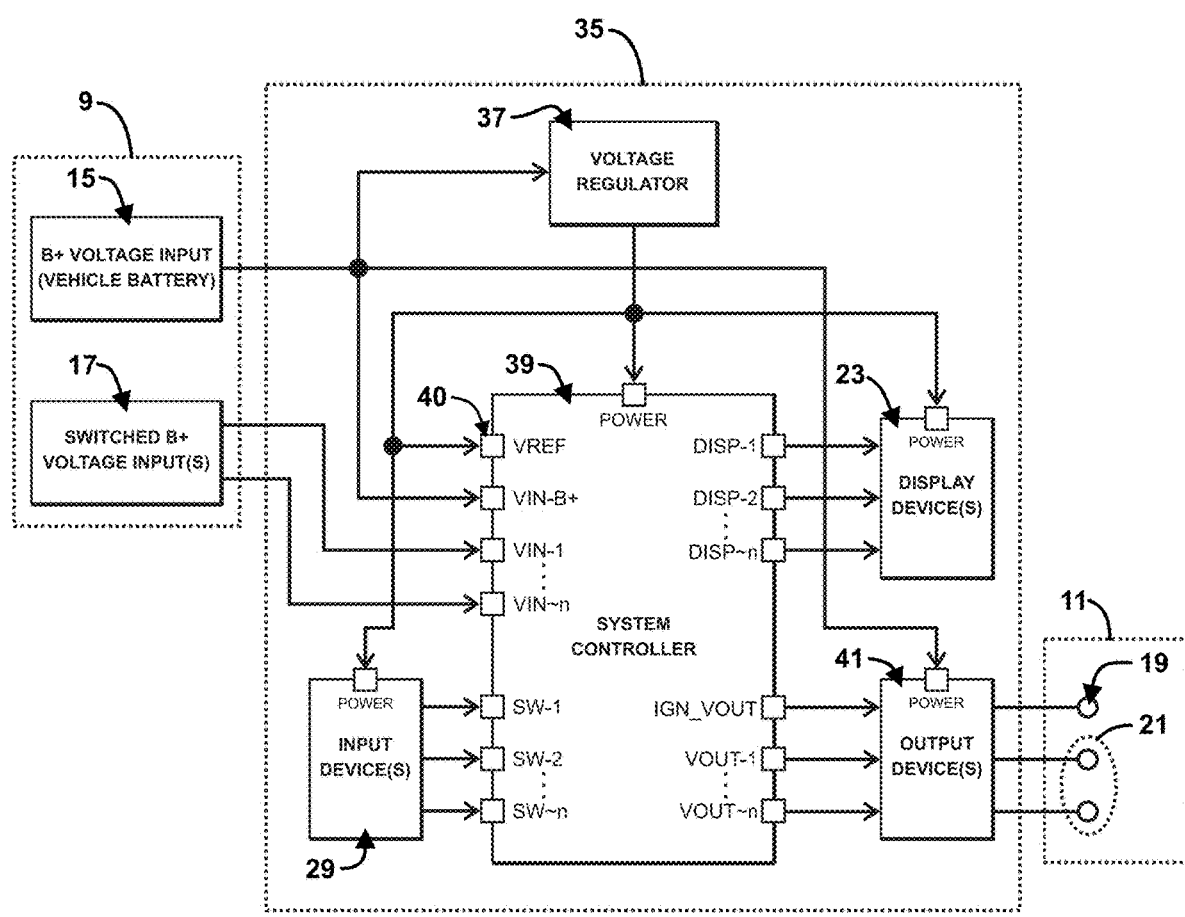
FIG. 2 is a block diagram of components of one embodiment of the present disclosure.

Turning to FIG. 2, a block diagram representing the main functional components 35 of the IGN-REM generator 1 is shown, as well as the corresponding connections to a power supply connection terminal 9 and an output connection terminal 11. The block diagram of main functional components 35 is comprised of a voltage regulator 37, a system controller 39, input devices 29, display devices 23 and output devices 41.

The voltage regulator 37 provides an appropriate voltage to run the system controller 39, the input devices 29 and the display devices 23, as well as providing a fixed voltage reference (VREF) 40 to the system controller 39. A fixed voltage reference (VREF) 40 allows the system controller 39 to accurately compare voltage changes present at the vehicle battery B+ connection 15 to calculate whether the vehicle engine is running due to the increased voltage provided by the alternator when exceeding the programmed ignition detection threshold or whether the vehicle engine is off when the voltage present at the B+ connection 15 has dropped below the programmed ignition detection threshold.

The system controller 39 in one embodiment contains built-in memory and is capable of converting analog DC input voltages such as from a fixed voltage reference (VREF) 40 and potentially changing voltage such as from a vehicle battery B+ connection 15 to digital values representing said analog voltages in order to calculate when a changing voltage has exceeded or dropped below a threshold stored in its memory to determine an output action according to a programmed function. The system controller 39 outputs control the output devices 41, which are provided with additional power by the vehicle battery B+ connection 15 directly or augmented with voltage regulation such as with a boost converter in order to activate or deactivate aftermarket devices connected at an output connection terminal 11. Although the present disclosure refers to a system controller 39 as a singular component, individual components providing relevant capabilities such as external memory, external analog to digital converters, external display drivers or the like may be substituted. Further, while the various embodiments of the present disclosure utilize a programmable system controller, it will be appreciated by those having ordinary skill in the art that any suitable implementation to achieve the features and functionalities of the device may be readily substituted without departing from the scope of the present disclosure. For example, instead of such programmable system controller, portions or the entirety of the system controller functionalities may be implemented with analog circuit elements.

Figure 3:
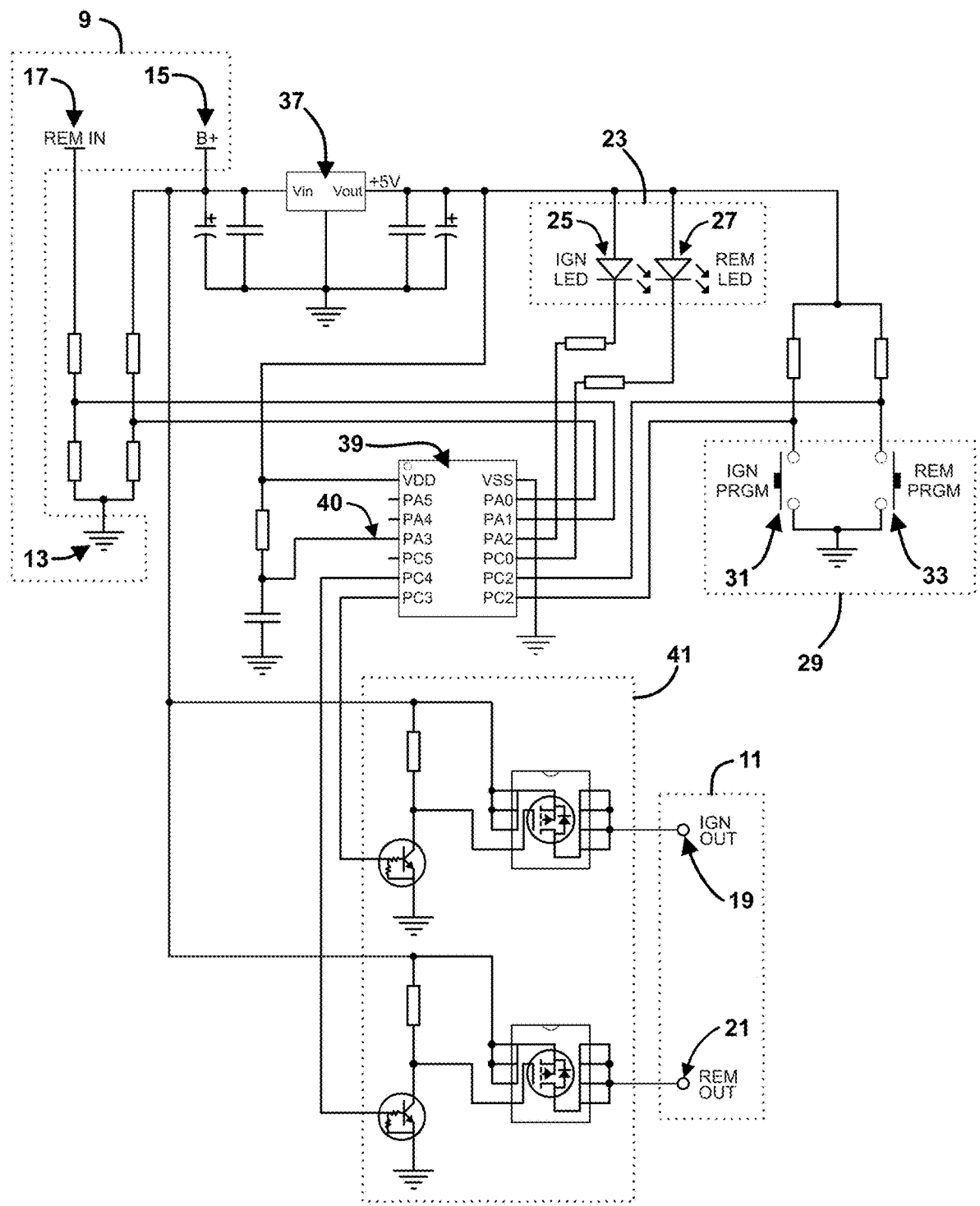
FIG. 3 is a circuit schematic of one preferred embodiment of the present disclosure.

FIG. 3 is a circuit schematic of one preferred embodiment of the present disclosure wherein individual circuit components and their interconnections are illustrated in more detail. The voltage regulator 37 is shown to be a linear regulator with a fixed regulated output of +5 VDC in order to provide power to a 14-pin micro controller as the system controller 39. Further, the input devices 29 are shown as two momentary switches 31 and 33 for programming the IGN-REM generator 1 in conjunction with display devices 23 as single color LEDs 25 and 27. Additionally, the output devices 41 are shown as p-channel logic level MOSFET ICs capable of lifting the micro controller 39 outputs to the voltage at the vehicle battery B+ connection 15 in order to generate source voltage outputs via the output connection terminal 11. The entire circuit ground is the same as that of chassis ground connection 13.

Figure 4:
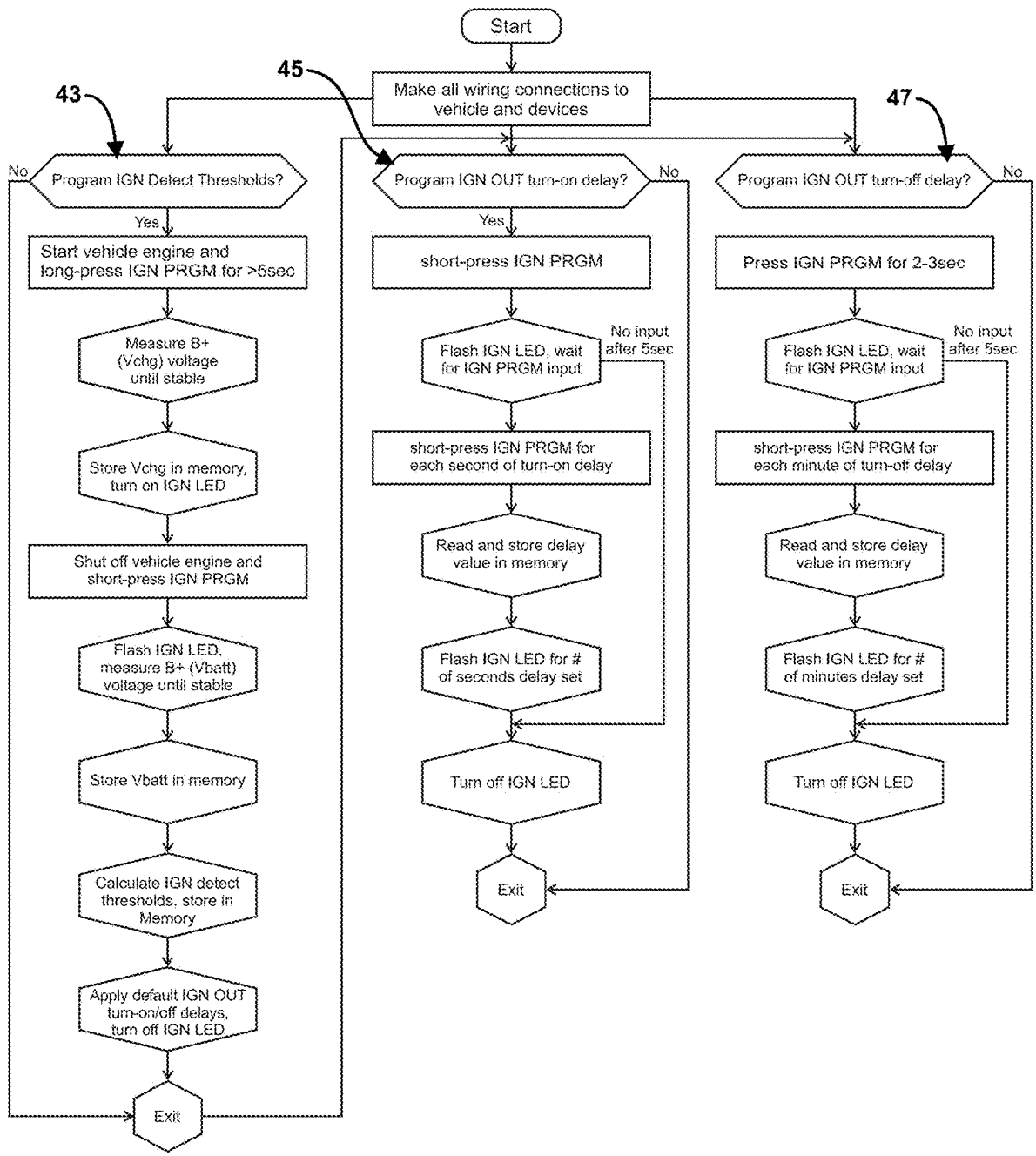
FIG. 4 is a flowchart illustrating a programming procedure for setting ignition detect thresholds and respective generated battery or regulated voltage output turn-on and turn-off delays in accordance with one preferred embodiment of the present disclosure.

FIG. 4 illustrates a programming procedure for setting ignition detect thresholds and respective generated source voltage output turn-on and turn-off delays in accordance with a preferred embodiment of the present disclosure. When using the IGN-REM generator 1 to provide a generated source voltage output in relation to vehicle engine running status the output connection 19, the installer or end user must first program the ignition detect thresholds by means of an IGN detect threshold programming procedure 43 as outlined. Once the ignition detect thresholds are stored in memory, default delays for its related generated source voltage output 19 are applied from pre-programmed memory in the micro controller 39. If a particular vehicle factory electrical system or audio system or aftermarket component application in conjunction with the IGN-REM generator 1 requires a different turn-on delay than the pre-programmed default, then the installer needs to proceed to the IGN OUT turn-on delay programming procedure 45. Further, if required by a particular installation application, the installer may also be required to adjust the turn-off delay from the pre-programmed default by proceeding with the IGN out turn-off delay programming procedure 47.

Figure 5:
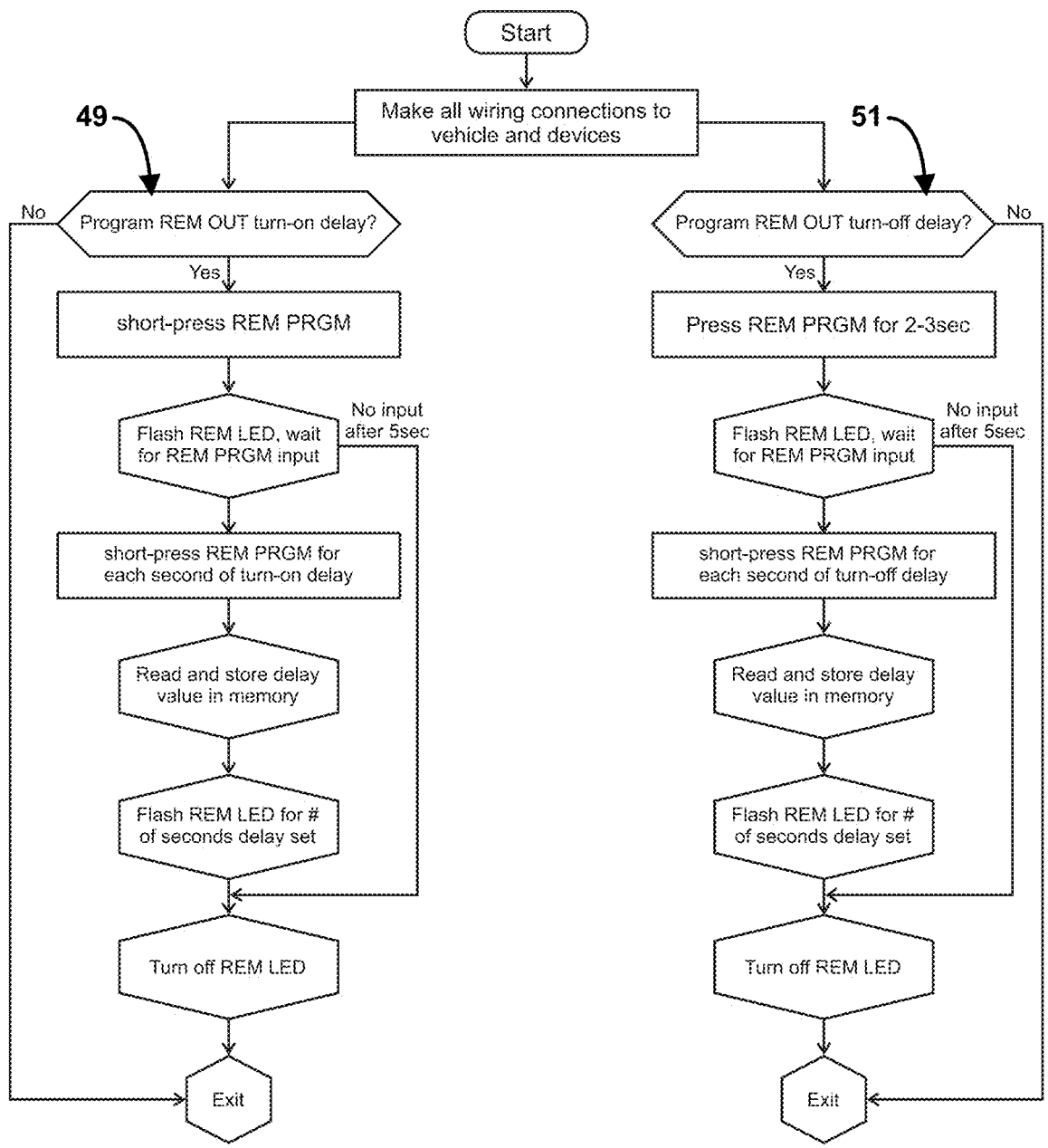
FIG. 5 is a flowchart illustrating a programming procedure for setting turn-on and turn-off delays of an additional generated battery or regulated voltage output in accordance with one preferred embodiment of the present disclosure.

FIG. 5 illustrates a programming procedure for setting turn-on and turn-off delays of a second generated source voltage output such as from an output connection 19 in accordance with a preferred embodiment of the present disclosure. If a particular installation application in conjunction with the IGN-REM generator 1 requires a turn-on delay be applied to an output connection 19 for proper component activation sequence such as for the remote input terminal of an aftermarket amplifier, the installer needs to proceed to the REM OUT turn-on delay programming procedure 49. If the application also requires a turn-off delay be applied for proper component deactivation sequence, then the installer need to proceed to the REM OUT turn-off delay programming procedure 51.

Figure 6:
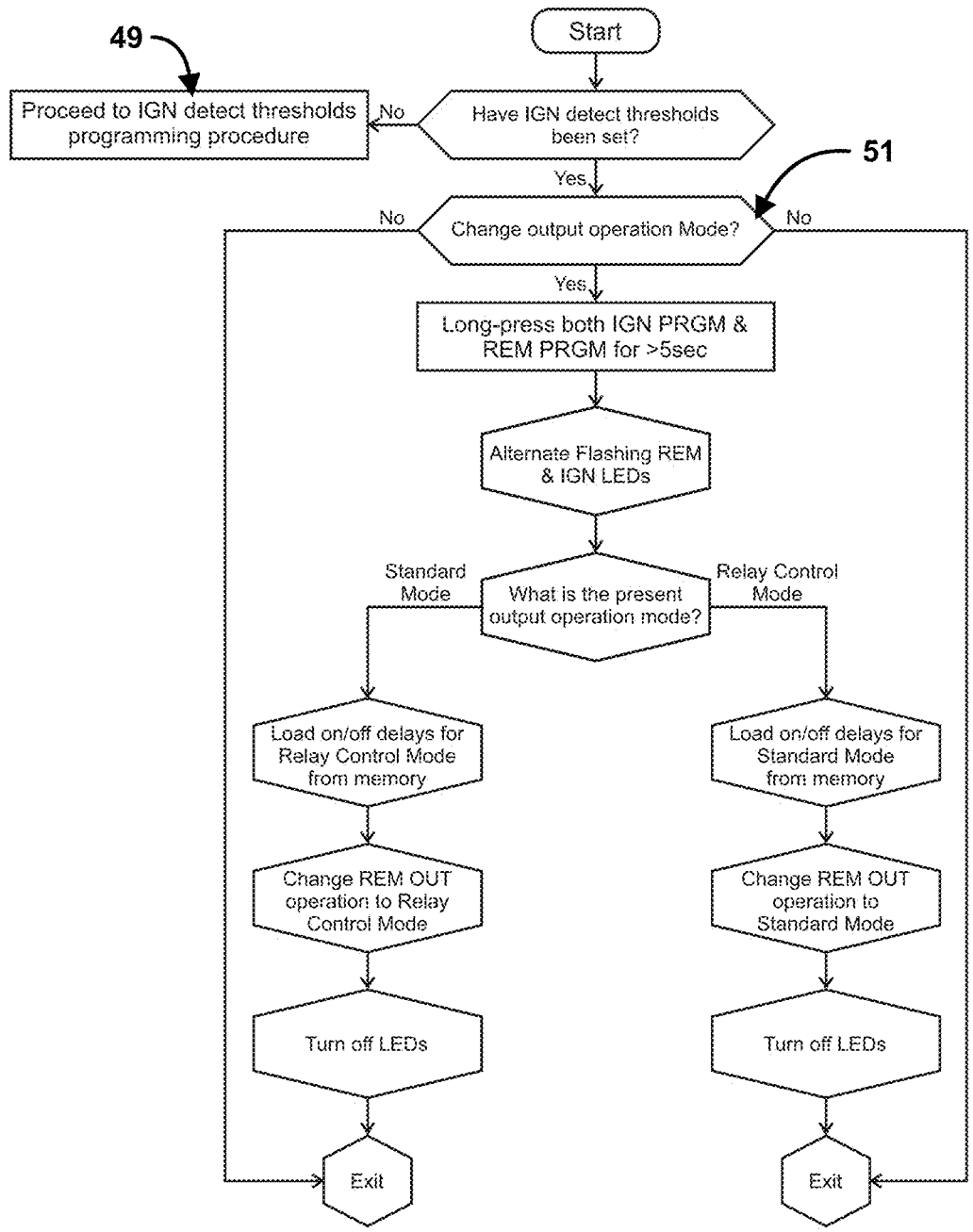
FIG. 6 is a flowchart illustrating a programming procedure for changing the output operation mode in accordance with one preferred embodiment of the present disclosure.

FIG. 6 illustrates a programming procedure for changing from the default output operation mode of the IGN-REM generator 1 in accordance with a preferred embodiment of the present disclosure. The default operation mode of the IGN-REM generator 1, herein after referred to as standard mode, is that an additional generated source voltage output (s) 21 is either directly activated in relation to the switched battery voltage input(s) 17 in addition to any delays set by the REM OUT turn-on and turn-off delay programming procedures 49 and 51, or when no connection is present at the switched battery voltage input(s) 17, output(s) connection 21 is activated following the activation of output connection 19 which corresponds to ignition detection status and any applied delays either from pre-programmed defaults or those set by the IGN OUT turn-on and turn-off delay programming procedures 45 and 47. The alternative operation mode of the IGN-REM generator 1 that can be selected by the output operation mode change procedure 53 is that a second generated source voltage output 21 becomes no longer responsive to its corresponding switched battery voltage input 17, but instead becomes directly linked to ignition detection status of the vehicle battery B+ connection 15 and a first output connection 19. This linked relation is such that output 21 is only energized to a battery voltage level by output device 41 when the system controller 39 determines that the vehicle engine has been shut off by detecting that the voltage at vehicle B+ connection 15 has dropped below the ignition detection threshold set by the IGN detect threshold programming procedure 43, and deactivated when the voltage at connection 15 has exceeded said threshold. This alternative operation mode of the IGN-REM generator 1 is herein after referred to as relay control mode. While in this preferred embodiment the output from at least one output connection 21 is of vehicle battery B+ voltage when activated, another embodiment may instead drive one output connection 21 to chassis ground in relation to ignition detection status. The operation mode change procedure 53 toggles the operation mode to the other from the present one set, so for example if the IGN-REM generator 1 is already in relay control mode, the operation mode change procedure 53 would change the IGN-REM generator 1 operation mode back to standard mode.

Figure 7A:
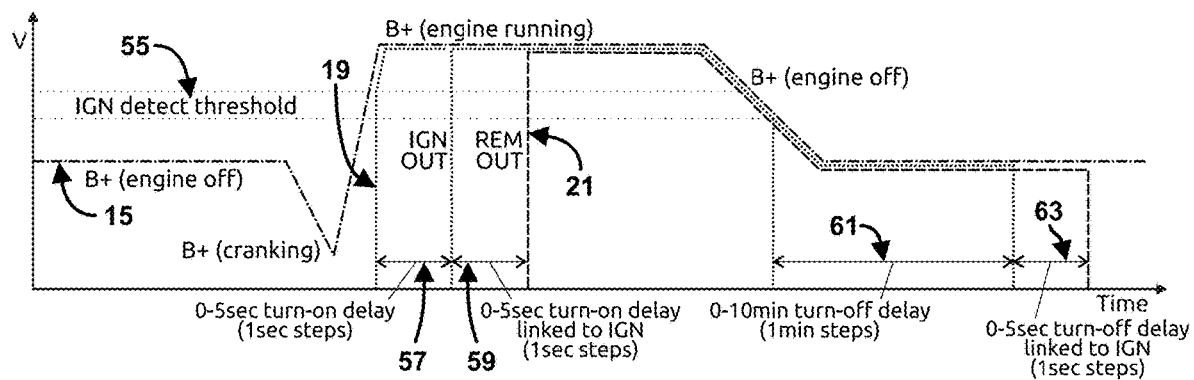
FIGS. 7A-7B depicts input and output voltages with respect to time of a corresponding connection diagram of one embodiment of the present disclosure to a factory vehicle electrical system and aftermarket devices.
Figure 7B:
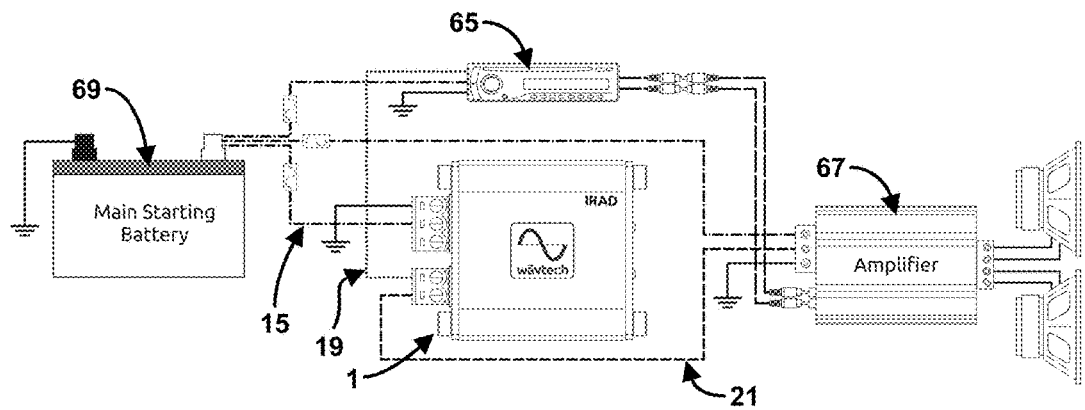

FIGS. 7A-7B depicts an application example of the IGN-REM generator 1 while operating in standard mode, illustrating input and output voltages with respect to sequence and time in relation to any delays set by the various programming procedures as a preferred embodiment of the present disclosure.

FIG. 7A depicts an example of the voltage changes present at the vehicle battery B+ connection 15, herein after referred to as B+ input 15 as it would be in a vehicle installation example as depicted in FIG. 7B before starting the engine, while the engine is running, and after the engine is shut off. A first generated battery voltage at an output connection 19, herein after referred to as IGN OUT 19, is shown as it would activate and deactivate in relation to exceeding and dropping below the IGN detection threshold 55 as set by the ignition detect thresholds programming procedure 43, as well as in timing relation as it is set by IGN OUT turn-on delay 57 and IGN OUT turn-off delay 61 as it is set in the IGN OUT turn-on and turn-off delay programming procedures 45 and 47. A second generated battery voltage at an output connection 21, herein after referred to as REM OUT 21, is shown as it would activate and deactivate in relation to its timing as set by the REM OUT turn-on delay 59 and turn-off delay 63 as it is set in programming procedures 49 and 51 automatically after those set for IGN OUT turn-on and turn-off delays 57 and 61. Alternatively if a switched battery voltage is connected to the switched battery voltage input 17, herein after referred to as REM IN 17, such as from a manual switch, the timing relation between IGN OUT 19 and REM OUT 21 would be overridden if the activation timing of REM IN 17 falls before the timing set for IGN OUT turn-on or turn off delays 57 and 61.

FIG. 7B depicts an example of a typical vehicle installation of the IGN-REM generator 1 as it would be connected with an aftermarket receiver 65 with aftermarket amplifier 67 and main starting battery 69 in a vehicle without a means to otherwise activate the aftermarket components. In this configuration an aftermarket radio 65 is connected to IGN OUT 19 and an aftermarket amplifier 67 is connected to REM OUT 21, which provides independent activation with turn-on and turn-off delays for each output 19 and 21 that can be programmed by the aforementioned delay programming procedures 45, 47, 49 and 51.

Figure 8A:
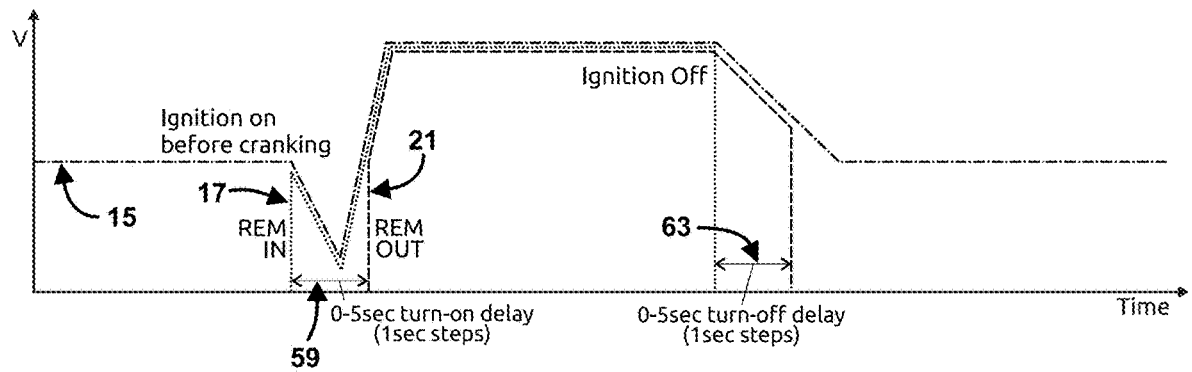
FIGS. 8A-B depict the respective input and output voltages respect to time of a corresponding connection diagram of one embodiment of the present disclosure to a factory audio system and aftermarket devices.
Figure 8B:
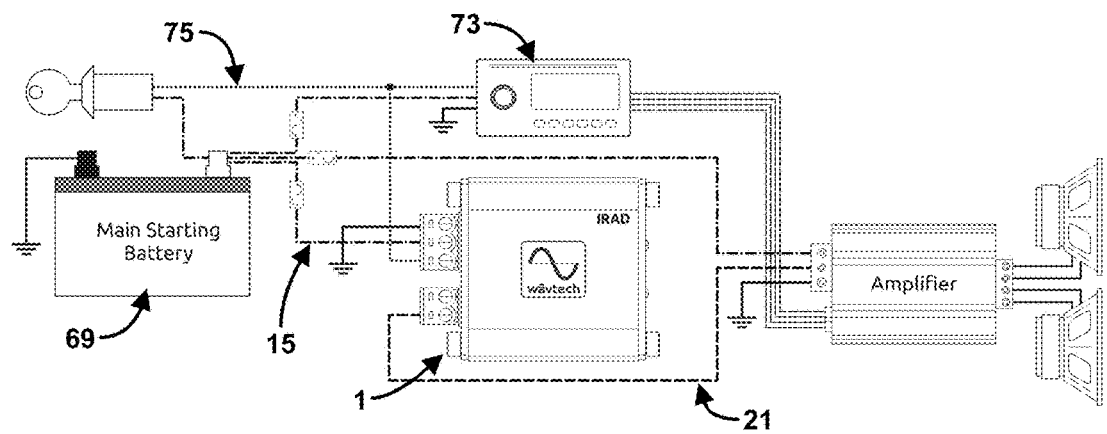

Turning to FIGS. 8A-8B, another installation example is depicted wherein a vehicle factory electrical system has an available switched ignition wire 75 that already activates a factory receiver 73, which can also be used as a switched battery voltage input to REM IN 17. In this application the IGN-REM generator 1 is being used to apply delays to the REM OUT 21 for providing different activation timing to an aftermarket amplifier 67 than the factory switched ignition wire 75 that activates the factory receiver 73. The typical associated voltages and timing of such an installation configuration in FIG. 8B is depicted in FIG. 8A as voltages B+ 15 and REM IN 17 with REM OUT turn-on/off delays 59 and 63. In this particular case due to the timing difference of the factory radio 73 activation with the switched ignition wire 75, the REM OUT turn-on delay 59 may be used to delay the IGN-REM generator 1 from activating the aftermarket amplifier 67 until after the vehicle battery voltage drop at the B+ input 15 due to starter cranking has passed. Alternatively, the B+ input 15 may also be connected to the main starting battery 69 as previously disclosed if an additional output with programmable delays would be desired, despite a switched ignition wire 75 being available, for additional sequence and delay timing options.

Figure 9A:
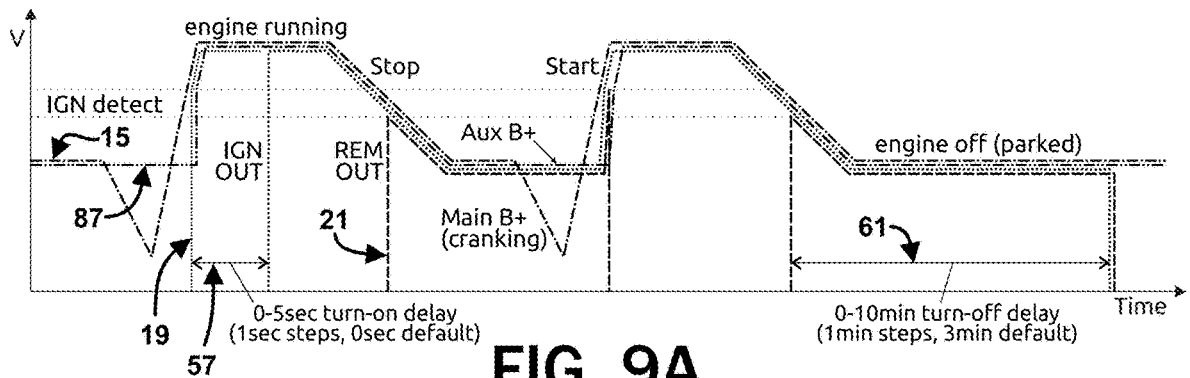
FIGS. 9A-B depict the respective input and output voltages respect to time of a corresponding connection diagram of one embodiment of the present disclosure to a factory electrical system with an auxiliary battery and aftermarket devices.
Figure 9B:
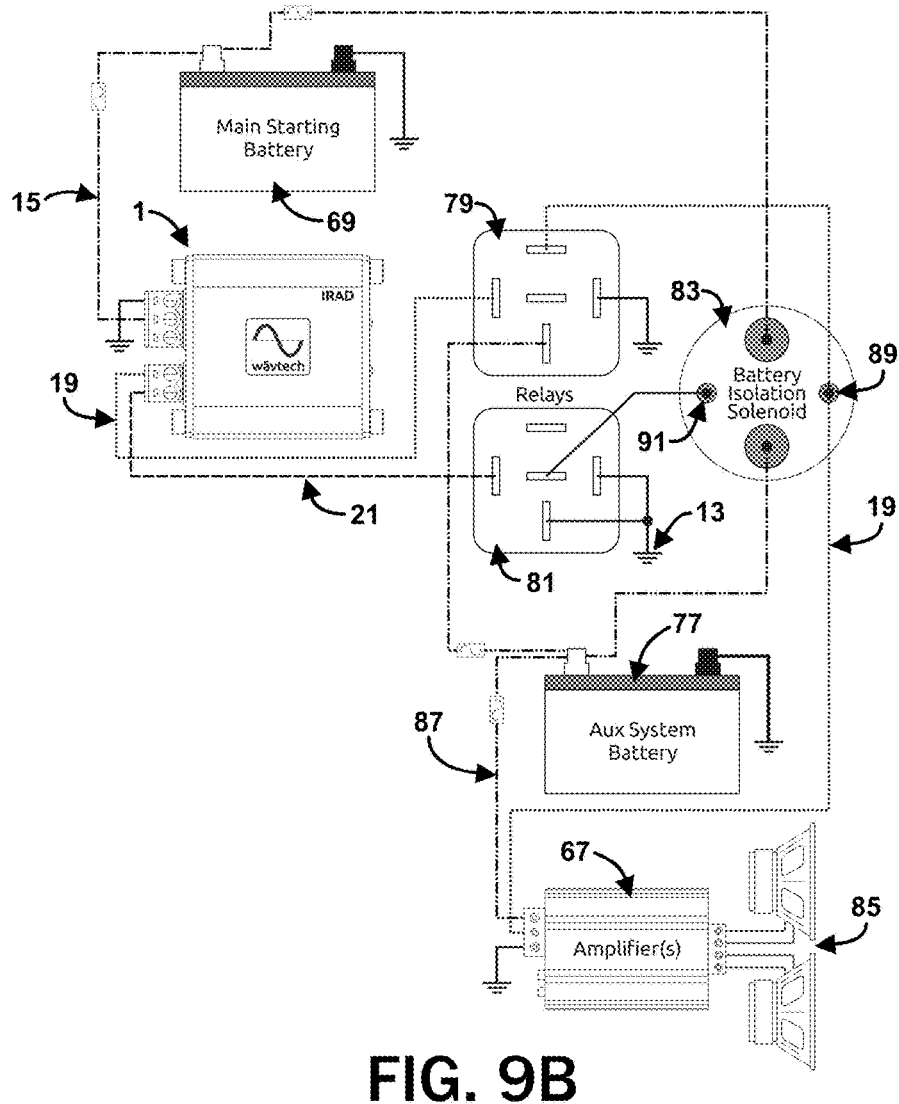

FIGS. 9A-9B depicts an installation configuration and associated voltages and timing as one embodiment of the present disclosure, wherein the IGN-REM generator 1 is operating in relay control mode by changing the output operation mode from the default standard mode via the output operation mode change procedure 53. When changed to relay control mode, different pre-programmed IGN OUT turn-on and turn-off delays 57 and 61 than those from standard mode are loaded from the memory unless overridden by the IGN OUT turn-on and turn-off delay programming procedures 45 and 47 and the ability to set REM OUT turn-on and turn-off delay programming procedures 49 and 51 is disabled. Additionally the REM OUT turn-on and turn-off delays 59 and 63 are set to zero seconds and monitoring of REM IN 17 by the system controller 39 is defeated, since in relay control mode, the activation/deactivation behavior of REM OUT 21 is set to be directly linked ignition threshold detection, whereby it is activated when the voltage at B+ input 15 exceeds the thresholds set by the IGN detect threshold programming procedure 43 representing that the vehicle engine is running and deactivated when the voltage at B+ input 15 falls below the set threshold representing that the vehicle engine has been shut off.

FIG. 9B depicts a typical installation configuration of the IGN-REM generator 1 with aftermarket components such as an amplifier 67 while operating in the relay control mode when connected to a vehicle factory electrical system without an available switched ignition wire and said vehicle also has stop-start functionality that cannot be overridden. This operational mode has several application benefits, such as preventing a voltage drop from the main starting battery 69 caused by starter cranking during stop-start events from negatively affecting aftermarket component operation, removing current drain on the main starting battery 69 for powering aftermarket components when connected to an auxiliary battery 77 for a set period of time when the engine is shut off while continuing to activate aftermarket components connected to an auxiliary battery 77, and eliminating any long term current drain on the main starting battery by deactivating battery isolation components such as a normally open relay 79, a normally closed relay 81 and a battery isolation solenoid 83 with a positive activation terminal 89 and a negative activation terminal 91 after the vehicle is parked and engine shut off after a set period of time. The main starting battery 69 and auxiliary battery 77 are connected by the battery isolation solenoid 83 when the normally open relay 79 connects the auxiliary battery voltage 87 to the positive terminal 89 when driven by IGN OUT 19 and a normally closed relay 81 connects the common ground of chassis ground connection 13 to the negative activation terminal 91 when driven by REM OUT 21. The main starting battery and auxiliary battery are disconnected (isolated) when either or both the positive terminal 89 is disconnected from auxiliary battery voltage 87 and/or the negative terminal 91 is disconnected from the common chassis ground connection 13, thus de-energizing the internal coil of the battery isolation solenoid 83 and removing its current draw.

In addition to providing the aforementioned benefits for stop-start enabled vehicles, the generated ignition output from IGN OUT 19 can also be used to activate aftermarket components such as an amplifier 67 via its remote turn-on input terminal and utilize the adjustable IGN OUT turn-on delay 57 to alleviate any start-up timing sequence issues between the factory radio 73 activation timing and that of the aftermarket amplifier 67 and connected loudspeakers 85. While the system diagram in FIG. 9B represents a typical installation, many other configurations are factory electrical system connections and aftermarket component connections are possible and alternative components other than the automotive relays 78 and 81 and isolation solenoid 83 may be substituted to achieve separation and connection control as intended between the main starting battery 69 and an auxiliary battery 77.

FIG. 9A depicts the associated voltages and timing of the system connection diagram as described for FIG. 9B when the IGN-REM generator 1 is operating in relay control mode. The voltage at B+ input 15 is that of the main starting battery 69 and is shown as it would typically be in a vehicle with stop-start functionality, illustrating voltage when the engine is running, when the engine is off, and the effects of starter cranking current draw induced voltage drop of the main starting battery 69 at various times. The voltage 87 is that of the auxiliary battery 77, which shows how it would behave in relation to the voltage at the B+ input 15 due to the IGN-REM generator 1 outputs IGN OUT 19 and REM OUT 21 control of relays 79 and 81 and solenoid 83 as they are activated and deactivated in relation to the IGN OUT turn-on and turn-off delays 57 and 61 and the dependent timing of REM OUT 21 as they follow the auxiliary battery voltage 87. Thus FIG. 9B illustrates how the IGN-REM generator can prevent aftermarket components such as an aftermarket amplifier 67 from seeing dramatic supply voltage drops when connected to an auxiliary battery 77 during stop-start events while also remaining continually activated via the IGN OUT 19 connection to the amplifier in accordance with the timing set by IGN OUT turn-on and turn-off delays 57 and 61. FIG. 9B further illustrates how the IGN OUT 19 and REM OUT 21 output timing may be adjusted other than the pre-programmed default settings for IGN OUT turn-on and turn-off delays 57 and 61 via the aforementioned programming procedures 45 and 47 in order to accommodate various system configurations and connected component(s) start-up and shut-down sequence requirements.

Although a standalone device is disclosed as one possible embodiment, this is by way of example only and not of limitation. For instance, the components and functionalities of the device may be incorporated into another device with its own inherent functionalities such as an aftermarket amplifier or other audio and non-audio related aftermarket devices without deviating from the intent and scope of the present disclosure, and thus achieve the same functionalities as described herein. Along these lines, while an automotive application has been illustrated in connection with one preferred embodiment, there may be alternative embodiments in which the components described herein are adapted to other installations in which a DC power source to audio and other electronic components may be intermittent depending on the operation of an electromechanical power generation apparatus, such as on marine craft, aircraft, and the like.

The particulars shown herein are by way of example and for purposes of illustrative discussion of the embodiments of the disclosure only and are presented in the cause of providing what is believed to be the most useful and readily understood description of the principles and conceptual aspects. In this regard, no attempt is made to show details with more particularity than is necessary for the fundamental understanding of the present disclosure, the description taken with the drawings making apparent to those skilled in the art how the several forms of the present disclosure may be embodied in practice.

What is claimed is:

1. A vehicle ignition-remote output generator device, comprising:
a power supply connection terminal including a constant battery voltage input connectable to a vehicle starter battery;
an output connection terminal including a source voltage output and a switched source voltage output each connectable to power vehicle electronic components; and
a system controller with an input connected to the constant battery voltage input and outputs connected to corresponding ones of the source voltage output and the switched source voltage output, the system controller outputting an ignition generated voltage to the source voltage output in response to a detected ignition voltage from the constant battery voltage input being above a first detection threshold following a programmable ignition output turn-on delay and deactivating the ignition generated voltage in response to the detected ignition voltage from the constant battery voltage input being below the first detection threshold following a programmable ignition output turn-off delay.

2. The device of claim 1, wherein the system controller outputs a remote generated voltage to the switched source voltage output in response to the detected ignition voltage from the constant battery voltage input being above the first detection threshold following a programmable remote output turn-on delay and deactivating the remote generated battery voltage in response to the detected ignition voltage from the constant battery voltage input being below the first detection threshold following a programmable remote output turn-off delay.

3. The device of claim 2, wherein the output of the remote generated battery voltage is linked to the output of the ignition generated voltage.

4. The device of claim 2, wherein the deactivation of the output of the remote generated voltage is linked to the deactivation of the output of the ignition generated voltage.

5. The device of claim 2, wherein the programmable remote output turn-on delay is zero.

6. The device of claim 2, wherein the programmable remote output turn-off delay is zero.

7. The device of claim 1, wherein the first detection threshold, the programmable ignition output turn-on delay is zero.

8. The device of claim 1, wherein the programmable ignition output turn-off delay is zero.

9. The device of claim 1, wherein the power supply connection terminal includes a switched battery voltage input, and the system controller outputs a remote generated voltage to the switched source voltage output in response to a detected switched battery voltage from the switched battery voltage input being above a second detection threshold following a programmable remote output turn-on delay and deactivating the remote generated battery voltage in response to the detected switched battery voltage from the switched battery voltage input being below the second detection threshold following a programmable remote output turn-off delay.

10. The device of claim 9, wherein the output of the remote generated voltage is independent of the output of the ignition generated voltage.

11. The device of claim 9, wherein the deactivation of the output of the remote generated battery voltage is independent of the deactivation of the output of the ignition generated battery voltage.

12. An ignition-remote output generator device for a vehicle equipped with stop-start engine function, comprising:
- a power supply connection terminal including a constant battery voltage input connectable to a vehicle starter battery;
- an output connection terminal including a source voltage output and a switched source voltage output each selectively connectable to power vehicle electronic components;
- a switching network connected to the source voltage output and the switched source voltage output selectively interconnecting an auxiliary battery to the vehicle electronic components;
- a system controller with an input connected to the constant battery voltage input and outputs connected to corresponding ones of the source voltage output and the switched source voltage output, the system controller outputting an ignition generated voltage to the source voltage output in response to a detected ignition voltage from the constant battery voltage input being above a first detection threshold following a programmable ignition output turn-on delay and activating the switching network to interconnect the auxiliary battery to the vehicle electronic components in response to the detected ignition voltage from the constant battery voltage input being below the first detection threshold.

13. The device of claim 12, wherein the system controller deactivates the ignition generated battery voltage to the source voltage output in response to the detected ignition voltage from the constant battery voltage input being below the first detection threshold for a programmable ignition output turn-off duration.

14. The device of claim 12, wherein the switching network is an ignition output relay connected to the source voltage output, a remote output relay connected to the switched source voltage output, and a battery isolation solenoid connected to the auxiliary battery.

15. The device of claim 14, wherein the ignition output relay is a normally open relay.

16. The device of claim 14, wherein the remote output relay is a normally closed relay.

17. An apparatus for an ordered transmission of electrical power to vehicle accessories, the apparatus comprising:
- a constant battery voltage input connectable to a vehicle starter battery;
- a source voltage output connectable to at least one of the vehicle accessories;
- a switched source voltage output connectable to at least another one of the vehicle accessories;
- a system controller having a first operating mode selectively outputting an ignition generated voltage to the source voltage output and a remote generated voltage to the switched source voltage output each with selectively programmable time delays based upon an evaluation of an ignition generated battery voltage from the constant battery voltage input, and a second operating mode selectively interconnecting an auxiliary battery to the vehicle electronic components based upon an evaluation of the engine running status from a comparison of the constant battery voltage input to a threshold value.

18. The apparatus of claim 17, wherein the evaluation of the ignition generated voltage is a comparison of the ignition generated battery voltage to a detection threshold.

19. The apparatus of claim 17, wherein a time delay of the outputting of the remote generated voltage is linked to the outputting of the ignition generated voltage.

20. The apparatus of claim 17, wherein a time delay of the outputting of the remote generated voltage is independent of the outputting of the ignition generated voltage.

21. The apparatus of claim 17, further comprising a switching network with an ignition output relay connected to the source voltage output, a remote output relay connected to the switched source voltage output, and a battery isolation solenoid connected between the vehicle starter battery and the auxiliary battery.

* * * * *